(12) United States Patent
Wu

(10) Patent No.: US 10,356,602 B2
(45) Date of Patent: Jul. 16, 2019

(54) METHOD, DEVICE, AND SYSTEM FOR DYNAMICALLY BINDING A SMART CARD

(71) Applicant: ZTE CORPORATION, Shenzhen, Guangdong Province (CN)

(72) Inventor: Chuanxi Wu, Shenzhen (CN)

(73) Assignee: ZTE CORPORATION (CN)

( * ) Notice: Subject to any disclaimer, the term of this patent is extended or adjusted under 35 U.S.C. 154(b) by 382 days.

(21) Appl. No.: 15/313,952

(22) PCT Filed: Jul. 14, 2014

(86) PCT No.: PCT/CN2014/082168
§ 371 (c)(1),
(2) Date: Nov. 24, 2016

(87) PCT Pub. No.: WO2015/180243
PCT Pub. Date: Dec. 3, 2015

(65) Prior Publication Data
US 2017/0188226 A1 Jun. 29, 2017

(30) Foreign Application Priority Data
May 27, 2014 (CN) .......................... 2014 1 0229152

(51) Int. Cl.
*H04M 3/00* (2006.01)
*H04W 8/18* (2009.01)
(Continued)

(52) U.S. Cl.
CPC ........... *H04W 8/183* (2013.01); *H04W 8/186* (2013.01); *H04W 12/08* (2013.01); *H04W 4/70* (2018.02)

(58) Field of Classification Search
CPC ....... H04W 12/08; H04W 4/70; H04W 8/183; H04W 8/186; H04W 8/18; H04W 12/06
See application file for complete search history.

(56) References Cited

U.S. PATENT DOCUMENTS

| 2007/0145734 A1 | 6/2007 | Wen et al. |
| 2010/0020717 A1* | 1/2010 | McGregor ............. H04B 17/23 370/252 |
| 2012/0172016 A1* | 7/2012 | Veneroso ............. H04W 8/205 455/414.1 |

FOREIGN PATENT DOCUMENTS

| CN | 101072403 A | 11/2007 |
| CN | 101170823 A | 4/2008 |

(Continued)

OTHER PUBLICATIONS

3GPP TS 31.111 V9.2.0; 3rd Generation Partnership Project; Technical Specification Group Core Network and Terminals; Universal Subscriber Identity Module (USIM) Application Toolkit (USAT) (Year: 2010).*

(Continued)

*Primary Examiner* — Xin Jia
(74) *Attorney, Agent, or Firm* — McDonald Hopkins LLC

(57) ABSTRACT

Disclosed is a smart card dynamic binding method, herein, a UICC is provided with a first basic file and a second basic file, and before selecting an application, a USIM sets a PIN to a blocked state, instructs a terminal that a USIM service table supports an additional terminal profile, and receives a profile download instruction; after determining that the terminal supports a provide local information command, the USIM sends a proactive provide local information command to the terminal; the UICC receives a terminal response including an IMEI of the terminal, matches the IMEI number with the IMEI number in the first basic file; if the matching is successful, sets a status flag of binding check success into the second basic file; starts a USIM initialization process, sets the PIN to an unblocked status and a disabled status; also disclosed is a smart card dynamic binding device and system.

17 Claims, 4 Drawing Sheets

(51) Int. Cl.
*H04W 12/08* (2009.01)
*H04W 4/70* (2018.01)

(56) References Cited

FOREIGN PATENT DOCUMENTS

| | | |
|---|---|---|
| CN | 102510391 A | 6/2012 |
| CN | 102833066 A | 12/2012 |
| CN | 103107878 A | 5/2013 |
| CN | 103619013 A | 3/2014 |
| WO | 2010054472 A1 | 5/2010 |

OTHER PUBLICATIONS

3rd Generation Partnership Project; Technical Specification Group Services and System Aspects; Study on security aspects of Machine-Type Communications (MTC) and other mobile data applications communications enhancements (Release 12). 3GPP TR 33.868 V12.0.0 (Mar. 2014).
Technical Speification Group Core Network and Terminals. "Universal Subscriber Indentity Module(USIM)Application Toolkit(USAT)(Release 9)" 3GPP TS 31.111v9.2.0.

* cited by examiner

METHOD, DEVICE, AND SYSTEM FOR DYNAMICALLY BINDING A SMART CARD

TECHNICAL FIELD

The present document relates to terminal communication technologies, and more particularly, to a smart card dynamic binding method, device and system.

BACKGROUND

Internet of Things IOT, as an important part of the emerging high-tech industry, has become one of the key technologies used for responding to economic crisis and revitalizing the economy in the worldwide. The IOT service may be widely applied to many industries, including vehicles, electricity, finance, environmental protection, petroleum, personal and corporate security, hydrology, military, fire, weather, coal, agriculture and forestry, elevators, and so on. It is expected that the Internet of Things service will quickly enter into many industries, the number of its users will grow rapidly in the next few years. It is expected that at the end of 2015, China's domestic Internet of Things industry will reach 750 billion. The Internet of Things applications will become one of the core applications in the long-term evolution LTE and the fifth generation 5G communication technologies in a number of years, and have broad development prospects. Currently, in the application types of the Internet of Things service, for some applications, the terminal requires that only a specified range of subscriber cards can be used; for some other applications, the subscriber cards are required to be configured to specified terminals; and for still some other applications, it is required that the specified range of terminals may match subscriber cards with specified identifications, which are all related to the binding issue between the terminal and the subscriber card. Currently, there are many binding schemes in the market. The mainstream solutions are as follows: 1, the scheme of the network side authenticating, the scheme needs to add an equipment identification register EIR in the terminal, and according to the International Mobile Equipment Identifier IMEI information, the EIR register is configured with white, black and gray tables. During a network interaction process of the terminal, the mobile switching center MSC and the visiting location register VLR request the terminal for the IMEI and send it to the EIR, the EIR compares the received IMEI with the white, black and gray tables, and sends the result to the MSC or the VLR, so that the MSC or the VLR decide whether to allow the terminal entering into the network. This scheme requires to add additional equipment investment at the network side, and there is a signaling interaction operation with the network, which virtually increases the channel occupancy of the air interface and makes the implementation process more complicated. 2, the scheme of the terminal proactively authenticating, the scheme is also widely used, there are several types of typical locking card, locking network and smart card binding: locking mesh, locking subnet, locking operators, collaborators binding, etc. For example, the Chinese patent entitled "A Method and Apparatus for Implementing and Removing a Binding of Terminal Equipment and Subscriber Identity Card", application No. 200710106103.6, is a representative of such implementation scheme. The implementations of these types of schemes are substantially similar, that is, by developing a corresponding authentication code at the terminal, and interacting with the Subscriber Identity Module SIM card/Universal Subscriber Identity Module USIM card, reading information of the file specified by the SIM/USIM card and comparing with the authentication code at the terminal, the locking or binding of the SIM/USIM card and the terminal is realized. Although the realization of the second scheme is simpler than that of the first scheme, the corresponding unlocking (unbinding) and locking (binding) operations are needed to be performed at the terminal, therefore, the second scheme is very tedious to use; moreover, once blocked (bound), the user cannot use the terminal in other operator networks, resulting in very poor user experience and a waste of resources. With the development of the Internet of things technology, the existing smart card binding technology is far from satisfying the binding and locking requirements between the M2M Equipment and the subscriber cards in the Internet of Things, and many Internet of things applications also have higher and higher requirements on the binding security of the terminal and the subscriber card.

SUMMARY

In order to solve the existing technical problem, the embodiments of the present document mainly provide a smart card dynamical binding method, device and system.

The technical scheme of the embodiment of the present document is realized as follows:

the embodiment of the invention provides a smart card dynamic binding method, including:

a universal integrated circuit card UICC being provided with a first basic file and a second basic file, herein, the first basic file is used for pre-storing an IMEI of a terminal or a group of terminals, and the second basic file is used for storing a status flag of a binding check result;

a USIM in the UICC setting a personal identification number PIN to a blocked state before selecting an application, instructing the terminal that the USIM Service Table supports an additional terminal profile, and receiving a profile download instruction from the terminal;

the USIM sending a proactive PROVIDE LOCAL INFORMATION command to the terminal after determining that the terminal supports the PROVIDE LOCAL INFORMATION command;

the UICC receiving a TERMINAL RESPONSE including the IMEI of the terminal, matching the IMEI number with the IMEI number in the first basic file, and when the matching succeeds, determining that the binding check succeeds, setting a status flag of binding check success into the second basic file, and starting an initialization process of the USIM, and setting the PIN to an unblocked state and a disabled state.

In the abovementioned scheme, said sending the provide local information command to the terminal includes: executing the sending of the provide local information command through an application program which is pre-embedded in the UICC as a code of an operating system in the UICC.

In the abovementioned scheme, the UICC matching the IMEI number with the IMEI number in the first basic file includes: executing the matching of the IMEI number of the terminal with the IMEI number in the first basic file through a script file.

In the abovementioned scheme, the script file is pre-embedded in the UICC as a code of the operating system in the UICC.

In the abovementioned scheme, the method further includes: the UICC accepting a dynamic management of a management platform for the first basic file through an OTA mechanism.

In the abovementioned scheme, the method further includes: the UICC providing background personnel with a read of the status flag of binding check result in the second basic file through the OTA mechanism.

In the abovementioned scheme, the method further includes: when the UICC interacts the OTA with the terminal, the terminal determining that a data change has occurred in the first basic file, and executing operations of restarting and resetting the terminal, the UICC initializing after the terminal is restarted, and re-executing the binding check of the UICC and the terminal.

In the abovementioned scheme, the method further includes: when a data change has occurred in the first basic file, the UICC sending a proactive refresh command to the terminal to trigger a 3G session or a reset of the UICC; after the UICC refreshes, the terminal initializing and re-executing the binding check of the UICC and the terminal.

The embodiment of the present document provides a smart card dynamic binding method, herein the method includes:

a terminal receiving an instruction that a USIM service table supports an additional terminal profile sent by a USIM in a UICC and returning a profile download instruction;

the terminal receiving a provide local information command sent by the USIM in the UICC and sending a terminal response including an IMEI number of the terminal to the UICC.

In the abovementioned scheme, the method further includes: when the UICC interacts an OTA with the terminal, the terminal determining that a data change has occurred in a first basic file, and executing operations of restarting and resetting the terminal.

In the abovementioned scheme, the method further includes: when receiving a proactively refresh command sent by the UICC, the terminal performs a refresh operation to trigger a 3G session or a reset of the UICC.

The embodiment of the present document provides a smart card dynamic binding method, including:

a UICC being provided with a first basic file and a second basic file, herein, the first basic file is used for pre-storing an IMEI number of a terminal or a group of terminals, and the second basic file is used for storing a status flag of binding check result;

a USIM in the UICC setting a PIN to a blocked state before selecting an application, and instructing the terminal that a USIM service table supports an additional terminal profile;

the terminal receiving the instruction that the USIM service table supports the additional terminal profile sent by the USIM in the UICC and returning a profile download instruction;

the USIM receiving the profile download instruction and sending a provide local information command to the terminal after determining that the terminal supports the provide local information command;

the terminal receiving the provide local information command sent by the USIM and sending a terminal response including an IMEI number of the terminal to the UICC;

the UICC matching the IMEI number of the terminal with the IMEI number in the first basic file, and when the matching succeeds, the UICC determining that the binding check succeeds, setting the status flag of binding check success into the second basic file, starting an initialization process of the USIM, and setting the PIN as an unblocked state and a disabled state.

The embodiment of the present document provides a UICC, the UICC is provided with a first basic file and a second basic file, herein, the first basic file is used for pre-storing an IMEI of a terminal or a group of terminals, and the second basic file is used for storing the status flag of binding check result; the UICC further includes: a USIM application module, and a matching module; herein, the USIM application module is configured to set a PIN to a blocked state before selecting an application, instruct the terminal that a USIM service table supports an additional terminal profile, and receive a profile download instruction from the terminal, after determining that the terminal supports a provide local information command, send a proactively provide local information command to the terminal and sets the PIN to an unblocked state and a disabled state after starting an initializing process of the USIM;

a matching module, configured to receive a terminal response including an IMEI of the terminal, match the IMEI number with the IMEI number in the first basic file, and determine that the binding check succeeds when the matching succeeds, set the status flag of binding check success into the second basic file, and start an initialization process of the USIM.

In the abovementioned scheme, the USIM application module is specifically configured to execute the sending of the proactive provide local information command through an application program which is pre-embedded in the UICC as a code of an operating system in the UICC.

In the abovementioned scheme, the matching module is specifically configured to execute the matching of the IMEI number of the terminal with the IMEI number in the first basic file through a script file.

In the abovementioned scheme, the UICC further includes: a dynamic management module, configured to accept a dynamic management of a management platform for the first basic file through an OTA mechanism.

In the abovementioned scheme, the dynamic management module is further configured to provide background personnel with a read of the status flag of binding check result in the second basic file through the OTA mechanism.

In the abovementioned scheme, the UICC further includes: a re-binding module, configured to notify the USIM application module after the terminal is restarted; or send a proactive refresh command to the terminal when a data change has occurred in the first basic file, to trigger a 3G session or a reset of the UICC, and notify the USIM application module after the terminal refreshes.

The embodiment of the present document provides a terminal, and the terminal includes: a profile download instruction providing module, and an IMEI number providing module; herein, a command transmitting and receiving module, configured to receive an instruction that a USIM service table supports an additional terminal profile sent by a USIM in a UICC and return a profile download instruction;

an IMEI number providing module, configured to receive a proactive provide local information command sent by the USIM in the UICC and send a terminal response including an IMEI number of the terminal to the UICC.

In the abovementioned scheme, the terminal further includes a restarting module, configured to determine that a data change has occurred in the first basic file in the UICC, and execute operations of restarting and resetting the terminal.

In the abovementioned scheme, the terminal further includes a refreshing module, configured to perform a refreshing operation upon receiving a proactive refresh command sent by the UICC to trigger a 3G session or a reset of the UICC.

The embodiment of the present document provides a smart card dynamic binding system, including a UICC and a terminal; herein, the UICC is provided with a first basic file and a second basic file, herein the first basic file is used for pre-storing an IMEI of a terminal or a group of terminals, and the second basic file is used for storing a status flag of binding check result;

the UICC is configured to set a PIN to a blocked state through the UICC's USIM before selecting an application, the USIM instructs the terminal that the USIM service table supports an additional terminal profile and receives a profile download instruction, after determining that the terminal supports a provide local information command, the USIM sends a proactively provide local information command to the terminal, the UICC is further configured to receive a terminal response including an IMEI number of the terminal, match the IMEI number with the IMEI number in the first basic file, and set the status flag of binding check success into the second basic file after determining that the binding check succeeds when the matching succeeds, start an initialization process of the USIM, and set the PIN to an unblocked state and a disabled state;

a terminal, configured to receive an instruction that the USIM service table supports the additional terminal profile sent by the USIM in the UICC and return the profile download instruction; and receive a proactive provide local information command sent by the USIM in the UICC and send the terminal response including the IMEI number of the terminal to the UICC.

The embodiment of the present document provides a smart card dynamic binding method, device and system, herein, a universal integrated circuit card UICC is provided with a first basic file and a second basic file, herein, the first basic file is used for pre-storing an International Mobile Equipment Identity IMEI of a terminal or a group of terminals, and the second basic file is used for storing a status flag of binding check result; a Universal Subscriber Identity Module USIM sets a personal identification number PIN to a blocked state before selecting an application, instructs the terminal that a USIM Service Table supports an Additional TERMINAL PROFILE, and receives a profile download instruction. After determining that the terminal supports the PROVIDE LOCAL INFORMATION command, the UICC receives a TERMINAL RESPONSE including the IMEI number of the terminal, matches the IMEI number with the IMEI number in the first basic file, and when the matching succeeds, determines that the binding check is successful, sets the status flag of binding check success into the second basic file, starts the initialization process of the USIM, sets the PIN to an unblocked state and a disabled state; therefore, the UICC is able to proactively bind with the terminal. The smart card dynamic binding method in the embodiment of the present document is simple in operation and easy to implement, and can satisfy the security requirements of the binding of the terminal and the smart card in the Internet of Things environment.

SPECIFIC EMBODIMENTS

The USIM Application Toolkit USAT increases the new proactive operation capability of the SIM card based on the existing SIM card passive operation mode. The USAT technology allows applications in the Universal Integrated Circuit Card UICC to interoperate with terminals supporting the applications. That is, the USAT technology supports proactive dialogues between the UICC and the terminal, thereby making mobile subscribers have personalized additional services. According to the 3GPP latest version 3GPP TS 31.111 12.3.0 (released in 2014.03), the UICC supports a variety of proactive commands, such as PROVIDE LOCAL INFORMATION, DISPLAY TEXT, REFRESH, SEND SHORT MESSAGE, SET UP CALL, and so on.

Herein, the PROVIDE LOCAL INFORMATION command requires the terminal to provide some parameters of itself such as mobile country code MCC, mobile network code MNC, location area code LAC/tracking area code TAC, the cell ID of the current service area, the IMEI of the terminal, or the International Mobile Equipment Identification Software Version IMEISV, and the like.

In the embodiment of the present document, the UICC is provided with a first basic file and a second basic file, herein, the first basic file is used for pre-storing an IMEI of a terminal or a group of terminals, and the second basic file is used for storing a status flag of a binding check result; before selecting an application, the USIM in the UICC sets the PIN as the blocked state and instructs the terminal that the USIM service table supports the additional terminal profile and receives a profile download instruction, and after determining that the terminal supports the provide local information command, the USIM sends a proactively provide local information command to the terminal. The UICC receives a terminal response including the IMEI number of the terminal, matches the IMEI number with an IMEI number in the first basic file, determines that the binding check is successful when the matching is successful, sets the status flag of binding check success into the second basic file, starts the initialization process of the USIM, sets the PIN to the unblocked state and the disabled state. Herein, the UICC generally refers to a UICC that can use the USAT technology and can be used in the 3G network, or other various smart cards that can use the USAT technology and be used as subscriber identification cards which is judged by professional personnel; the terminal may be a mobile equipment ME or a networking device capable of using the UICC.

The present document will be described in further detail with reference to the accompanying drawings and specific embodiments in the following.

The First Embodiment

Figure 1:
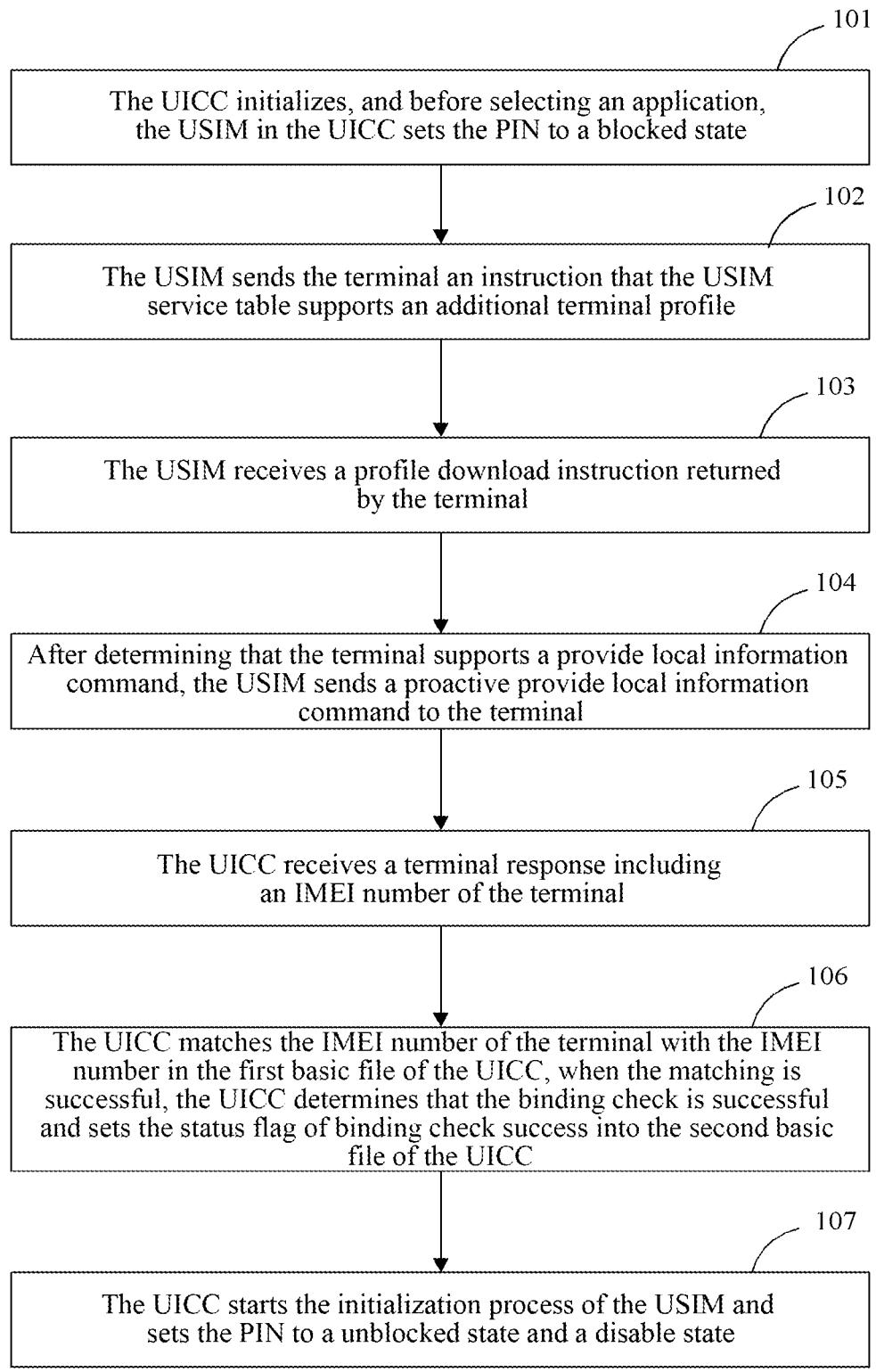
FIG. 1 is a flow chart of a smart card dynamic binding method implemented in accordance with an embodiment of the present document.

The first embodiment of the present document implements a smart card dynamic binding method, and as shown in FIG. 1, the method includes the following steps:

In step 101, the UICC initializes, and before selecting an application, the USIM in the UICC sets the PIN to the blocked state.

In step 102, the USIM sends an instruction that the USIM service table supports the additional terminal profile to the terminal.

In step 103, the USIM receives a profile download instruction returned by the terminal.

In step 104, after determining that the terminal supports the provide local information command, the USIM sends a proactive provide local information command to the terminal.

Herein, said sending a proactive provide local information command to the terminal includes: executing the sending of the proactive provide local information command through an application program which is pre-embedded in the UICC and may be used as the code of the operating system COS in the UICC.

In step 105, the UICC receives a terminal response including the IMEI number of the terminal.

In step 106, the UICC matches the IMEI number of the terminal with the IMEI number in the first basic file of the UICC, when the matching is successful, the UICC determines that the binding check is successful and sets the status flag of binding check success into the second basic file of the UICC.

Specifically, the UICC is pre-provided with the first basic file and the second basic file. Herein, the first basic file is used for pre-storing the IMEI number of a terminal or a group of terminals, the read permission of the first basic file is set as always, and other permissions are set as never. The second basic file is used to store the status flag of binding check result, and the status flag of binding check result may be a status flag of the latest binding check result of the UICC and the terminal, and may also be status flags of the latest N binding check results of the UICC and the terminal, N is an integer greater than 1, the read permission of the second basic file is set as always, and other permissions are set as never, and in addition, the second basic file may also store the IMEI number of the terminal corresponding to the status flag.

The IMEI number of the terminal and the IMEI number in the first basic file are matched through a script file, herein the script file is pre-embedded in the UICC, and may be used as the code of the operating system COS in the UICC, and the code has a scalability.

In step 107, the UICC starts the initialization process of the USIM and sets the PIN to an unblocked state and a disabled state.

In the present embodiment, step 104 further includes: when the USIM determines that the terminal does not support a provide local information command, the USIM determines that the binding check fails, and steps after the step 104 will not be executed.

Step 106 further includes: when the IMEI number of the terminal does not match the IMEI number in the first basic file of the UICC, it is determined that the binding check fails, and steps after step 106 will not be executed. Specifically, when the IMEI number of the terminal unsuccessfully matches with the IMEI number in the first basic file, the status flag of binding check fail is set into the second basic file.

In the method of the present embodiment, the UICC may also accept the dynamic management of the management platform for the first basic file through the over the AT interface OTA mechanism, including: operations of adding, deleting or changing the range of the IMEI number stored in the first basic file are performed to achieve the dynamic binding of the terminal and the UICC, herein, the management platform may be a group of servers.

In addition, the UICC may also provide the background personnel with the read of the status flag of binding check result in the second basic file through the OTA mechanism so that the background personnel can maintain the binding relationship between the UICC and the terminal.

The method of the present embodiment further includes: when the UICC interacts the OTA with the terminal, the terminal judges whether a data change has occurred in the first basic file. If there is any data change, the operations of restarting and resetting the terminal are executed, the UICC initiates after the terminal restarts, and re-executes the abovementioned binding check of the UICC and the terminal in the steps 101 to 107.

Alternatively, the UICC sends a proactive REFRESH command to the terminal to trigger a 3G session or a reset of the UICC when a data change has occurred in the first basic file, and after the terminal refreshes, the UICC initiates and re-executes the binding check of the UICC and the terminal in the abovementioned steps 101~107.

The Second Embodiment

Figure 2:
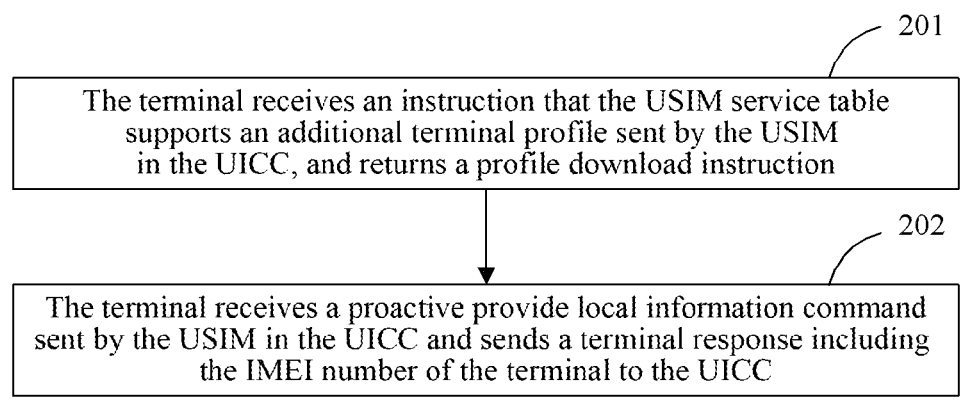
FIG. 2 is a flow chart of the smart card dynamic binding method implemented in accordance with a second embodiment of the present document.

The second embodiment of the present document implements a smart card dynamic binding method, and as shown in FIG. 2, the method includes the following steps:

In step 201, the terminal receives the instruction that the USIM service table supports an additional terminal profile sent by the USIM in the UICC and returns a profile download instruction.

In step 202, the terminal receives a proactive provide local information command sent by the USIM in the UICC and sends a terminal response including the IMEI number of the terminal to the UICC.

Herein, the terminal may be an ME or an Internet of Things device capable of using the UICC.

The UICC is pre-provided with the first basic file and the second basic file, herein, the first basic file is used for pre-storing the IMEI number of a terminal or a group of terminals, and the read permission of the first basic file is set as always, and other permissions are set as never. The second basic file is used for storing the status flag of binding check result, and the status flag of binding check result may be the status flag of the latest binding check result of the UICC and the terminal, and may also be the status flags of the latest N binding check results of the UICC and the terminal, herein N is an integer greater than 1. The read permission of the second basic file is set as always, and other permissions are set as never, moreover, the second basic file may also store the IMEI number of the terminal corresponding to the status flag. The terminal may read the status flag of binding check result in the second basic file, so as to determine whether the binding is successful.

When the UICC interacts the OTA with the terminal, the terminal judges whether a data change has occurred in the first basic file, and if there is any data change, the operations of restarting and resetting the terminal are executed so that the UICC initializes after the terminal restarts, and re-execute the binding check of the UICC and the terminal.

Alternatively, when the terminal receives the proactive REFRESH command sent by the UICC, the terminal performs a refresh operation to trigger a 3G session or a reset of the UICC so that the UICC initializes after the terminal is restarted, and re-executes the binding check of the UICC and the terminal.

The Third Embodiment

Figure 3:
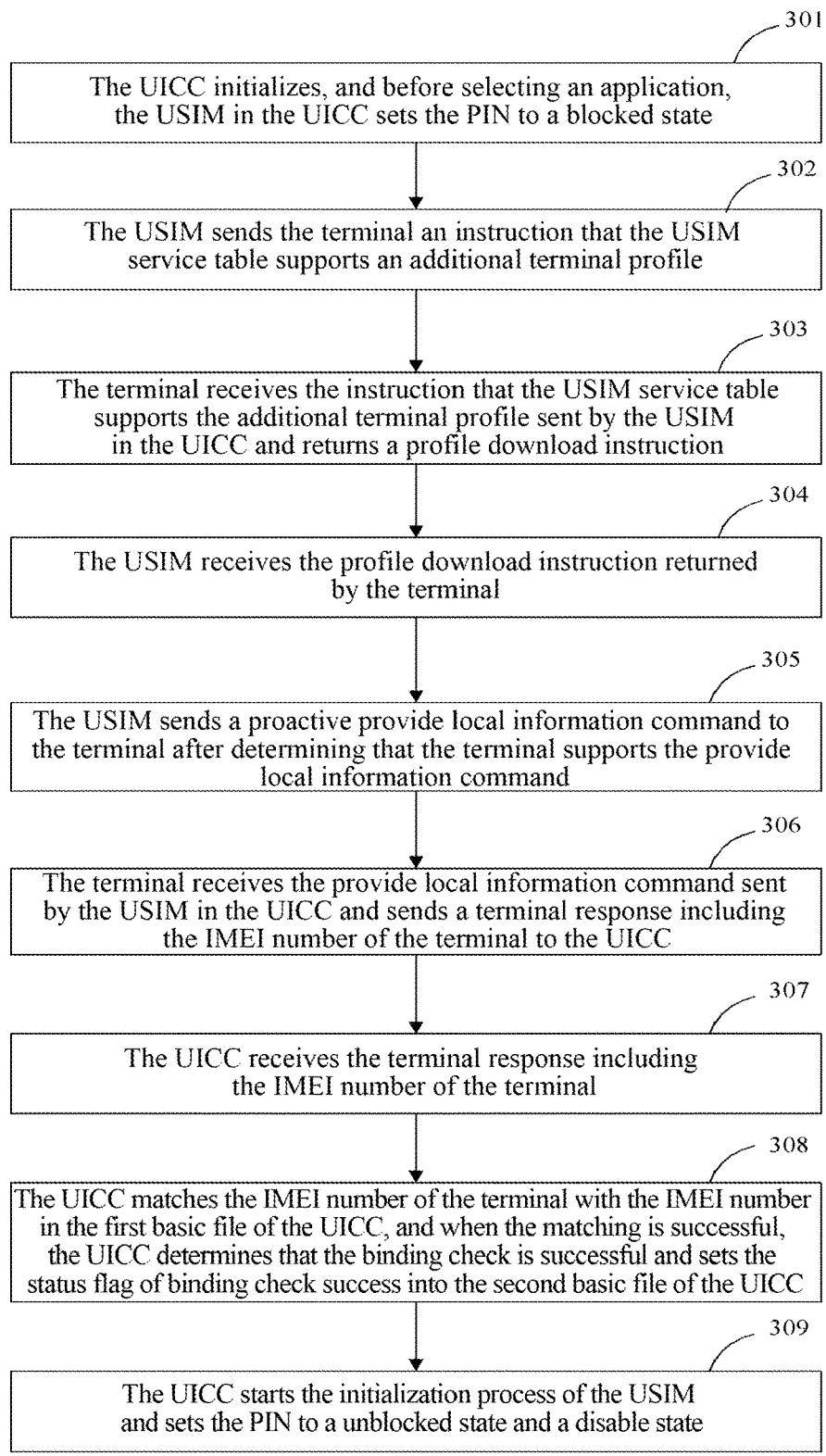
FIG. 3 is a flow chart of the smart card dynamic binding method implemented in accordance with a third embodiment of the present document.

The third embodiment of the present document implements a smart card dynamic binding method, and as shown in FIG. 3, the method includes the following steps:

In step 301, the UICC initializes, and before selecting an application, the USIM in the UICC sets the PIN to a blocked state.

In step 302, The USIM sends the terminal an instruction that the USIM service table supports an additional terminal profile.

In step 303, the terminal receives the instruction that the USIM service table supports the additional terminal profile sent by the USIM in the UICC and returns a profile download instruction.

In step 304, the USIM receives the profile download instruction returned by the terminal.

In step 305, the USIM sends a proactive provide local information command to the terminal after determining that the terminal supports the provide local information command.

Herein, said sending a proactive provide local information command to the terminal includes: the sending of the proactive provide local information command is executed through an application program which is pre-embedded in the UICC and may be used as the code of the operating system in the UICC.

In step 306, the terminal receives the provide local information command sent by the USIM in the UICC and sends a terminal response including the IMEI number of the terminal to the UICC.

In step 307, the UICC receives the terminal response including the IMEI number of the terminal.

In step 308, the UICC matches the IMEI number of the terminal with the IMEI number in the first basic file of the UICC, and when the matching is successful, the UICC determines that the binding check is successful and sets the status flag of binding check success into the second basic file of the UICC.

Specifically, the first basic file and the second basic file are pre-provided in the UICC, herein, the first basic file is used for pre-storing the IMEI number of a terminal or a group of terminals, the read permission of the first basic file is set as always, and other permissions are set as never. The second basic file is used to store the status flag of binding check result, the status flag of the binding check result may be the status flag of the latest binding check result of the UICC and the terminal, and may also be the status flags of the latest N binding check results of UICC and the terminal, herein N is an integer greater than 1. The read permission of the second basic file is set as always, and other permissions are set as never, moreover, the second basic file may also store the IMEI number of the terminal corresponding to the status flag.

The matching of the IMEI number of the terminal with the IMEI number in the first basic file is executed through a script file which is pre-embedded in the UICC and may be used as a code of the operating system COS within the UICC. The code has a scalability.

In step 309, the UICC starts the initialization process of the USIM and sets the PIN to an unblocked state and a disabled state.

In this embodiment, step 305 further includes: when the USIM determines that the terminal does not support the provide local information command, the USIM determining that the binding check fails, and no further steps after the step 305 will be executed.

Step 308 further includes: it is determined that the binding check fails when the IMEI number of the terminal does not match with the IMEI number in the first basic file of the UICC, and no further steps after step 308 will be executed. Specifically, when the IMEI number of the terminal matches with the IMEI number in the first basic file unsuccessfully, the status flag of binding check fail is set into the second basic file.

In the method of the present embodiment, the UICC may further accept the dynamic management of the management platform for the first basic file through the OTA mechanism, including: operations of adding, deleting, changing the range of the IMEI number stored in the first basic file are executed to implement the dynamic binding of the terminal and the UICC, herein, the management platform may be a group of servers.

In addition, the UICC may provide the background personnel with the read of the status flag of binding check result in the second basic file through the OTA mechanism, so that the background personnel can maintain the binding relationship between the UICC and the terminal.

The method of the present embodiment further includes: when the UICC interacts the OTA with the terminal, the terminal judging whether a data change has occurred in the first basic file, and if there is any data change, the operations of restarting and resetting the terminal are executed, the UICC re-initiates after the terminal restarts, and executes the binding check of the UICC and the terminal in the abovementioned steps 301 to 309 in the initialization process.

Alternatively, the UICC sends a proactive REFRESH command to the terminal to trigger a 3G session or a reset of the UICC when a data change has occurred in the first basic file. After the terminal refreshes, the UICC re-initializes and executes the binding check of the UICC and the terminal in the abovementioned steps 301 to 309 during the initialization process.

The Fourth Embodiment

Figure 4:
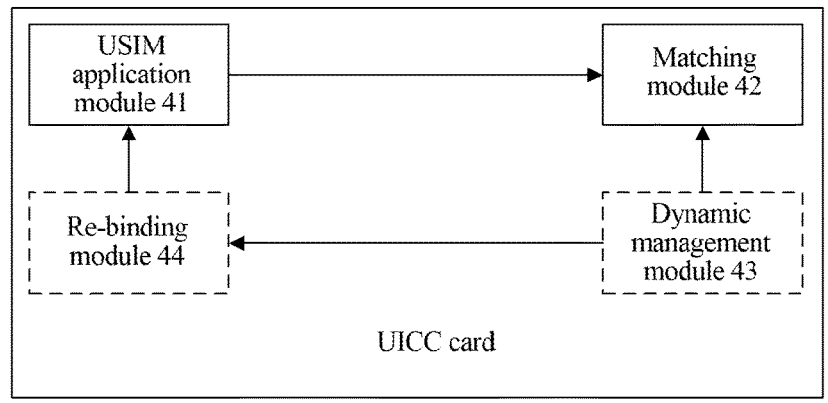
FIG. 4 is a schematic diagram of the structure of a UICC implemented in a fourth embodiment of the present document.

In order to implement the abovementioned method embodiments, the fourth embodiment of the present document provides a UICC, herein, the UICC is provided with a first basic file and a second basic file, herein the first basic file is used for pre-storing the IMEI of a terminal or a group of terminals, and the second basic file is used for storing the status flag of binding check result. As shown in FIG. 4, the UICC further includes USIM application module 41 and matching module 42; herein, the USIM application module 41 is configured to set the PIN to a blocked state before selecting an application, instruct the terminal that the USIM service table supports the additional terminal profile, and receive a profile download instruction from the terminal, and send a proactive provide local information command to the terminal after determining that the terminal supports the provide local information command, and set the PIN to an unblocked state and a disabled state after starting the initializing process of the USIM;

the matching module 42 is configured to receive a terminal response including the IMEI of the terminal, match the IMEI number with an IMEI number in the first basic file, and determine that the binding check is successful when the matching is successful, set the status flag of binding check successful into the second basic file, and start the initialization of the USIM.

Herein, the UICC generally refers to a UICC capable of using the USAT technology and used in the 3G network, or various other smart cards capable of using the USAT technology and capable of being used as subscriber identification cards which is judged by professional personnel.

The USIM application module 41 is specifically configured to execute the sending of the proactively provide local information command through an application program, which is pre-embedded in the UICC and can be used as the code of the operating system in the UICC.

In the present embodiment, the first basic file and the second basic file are required to be pre-provided in the UICC. Herein, the first basic file is used for pre-storing the IMEI number of a terminal or a group of terminals, the read permission of the first basic file is set as always, and other permissions are set as never. The second basic file is used to store the status flag of binding check result, herein the status flag of binding check result may be the status flag of the latest binding check result of the UICC and the terminal, and may also be the status flags of the latest N binding check results of the UICC and the terminal, herein N is an integer greater than 1. The read permission of the second basic file is set as always, and other permissions are set as never, moreover, the second basic file may further store the IMEI number of the terminal corresponding to the status flag.

The matching module 42 is specifically configured to perform the matching of the IMEI number of the terminal with the IMEI number in the first basic file through a script file pre-embedded in the UICC and may be used as the code of the operating system in the UICC. The code has a scalability.

The USIM application module 41 is further configured to determine that the binding check fails when the terminal does not support the provide local information command and not inform the information sending and receiving module 42.

The matching module 42 is specifically configured to determine that the binding check fails when the IMEI number of the terminal and the IMEI number in the first basic file do not match. In particular, when the matching of the IMEI number of the terminal and the IMEI number in the first basic file is unsuccessful, the matching module 42 sets the status flag of binding check fail into the second basic file.

In addition, the UICC further includes: dynamic management module 43, configured to accept the dynamic management of the management platform for the first basic file through the OTA mechanism, including: the operations of adding, deleting, and changing the range of the IMEI number stored in the first basic file are executed to achieve the dynamic binding of the terminal and the UICC. Herein, the management platform may be a group of servers.

The dynamic management module 43 is further configured to provide the background personnel with a read of the status flag of binding check result in the second basic file through the OTA mechanism so that the background personnel can maintain the binding relationship of the UICC and the terminal.

The UICC may further include re-binding module 44, configured to notify the USIM application module 41 after the terminal restarts; or, send a proactive REFRESH command to the terminal when a data change has occurred in the first basic file to trigger a 3G session or a reset of the UICC, and then after the terminal refreshes, notify the USIM application module 41.

The Fifth Embodiment

Figure 5:
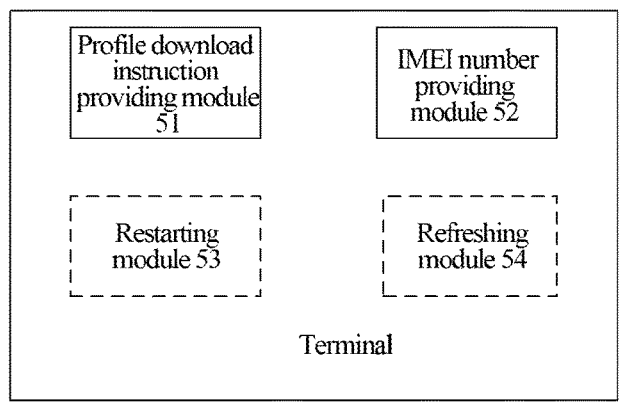
FIG. 5 is a schematic diagram of the structure of a terminal implemented in a fifth embodiment of the present document.

In order to realize the abovementioned method embodiments, the fifth embodiment of the present document provides a terminal. As shown in FIG. 5, the terminal includes profile download instruction providing module 51 and IMEI number providing module 52; herein, command sending and receiving module 51 is configured to receive an instruction that the USIM service table supports the additional terminal profile sent by the USIM in the UICC and return a profile download instruction;

the IMEI number providing module 52 is configured to receive a proactive provide local information command sent by the USIM in the UICC and send a terminal response including the IMEI number of the terminal to the UICC.

In another embodiment of the present embodiment, the terminal further includes restarting module 53, configured to judge whether a data change has occurred in the first basic file in the UICC, and to execute the operations of restarting or resetting the terminal if there is a data change, so that UICC re-initializes after the terminal is restarted, and performs the binding check of the UICC and the terminal during the initialization process.

In another embodiment of the present embodiment, the terminal further includes refreshing module 54, configured to perform a refresh operation upon receiving a proactive REFRESH command sent by the UICC to trigger a 3G session or a reset of the UICC, so that the UICC re-initializes and performs the binding check of the UICC and the terminal during the initialization process.

The Sixth Embodiment

Figure 6:
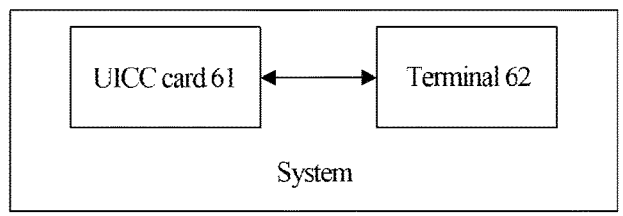
FIG. 6 is a schematic diagram of the structure of a smart card dynamic binding system implemented in a sixth embodiment of the present document.

In order to realize the abovementioned method embodiments, the sixth embodiment of the present document provides a smart card dynamic binding system. As shown in FIG. 6, the system includes: UICC 61 and terminal 62. Herein, the UICC 61 is provided with a first basic file and a second basic file. The first basic file is used for pre-storing the IMEI of a terminal or a group of terminals, and the second basic file is used for storing a status flag of binding check result, moreover, the second basic file may also store the IMEI number of the terminal corresponding to the status flag.

The UICC 61 is configured to set a PIN to a blocked state through the UICC's USIM before selecting an application. The USIM instructs the terminal that the USIM service table supports an additional terminal profile and receives a profile download instruction. After determining that the terminal supports the provide local information command, the USIM sends a proactive provide local information command to the terminal. The UICC is further configured to receive a terminal response including the IMEI number of the terminal, match the IMEI number with an IMEI number in the first basic file, and when the matching succeeds, set the status flag of binding check success into the second basic file after determining that the binding check is successful, start the initialization process of the USIM, and set the PIN to an unblocked state and a disabled state.

The terminal 62 is configured to receive an instruction that the USIM service table supports an additional terminal profile sent by the USIM in the UICC and return a profile download instruction; and receive a proactive provide local information command sent by the USIM in the UICC and send a terminal response including the IMEI number of the terminal to the UICC.

The UICC 61, as shown in FIG. 4, includes the USIM application module 41 and the matching module 42; herein, the USIM application module 41 is configured to set the PIN to the blocked state before selecting an application, instruct the terminal that the USIM service table supports the additional terminal profile, receive the profile download instruction from the terminal, and send the proactive provide local information command to the terminal after determining that the terminal supports the provide local information command, and set the PIN to the unblocked state and the disabled state after starting the initializing process of the USIM;

the matching module 42 is configured to receive a terminal response including the IMEI of the terminal, match the IMEI number with the IMEI number in the first basic file, and determine that the binding check is successful when the matching is successful, set the status flag of binding check success into the second basic file, and start the initialization process of the USIM.

The terminal 62, as shown in FIG. 5, includes a profile download instruction providing module 51 and an IMEI number providing module 52; herein, the profile download instruction providing module 51 is configured to receive the instruction that the USIM service table supports the additional terminal file sent by the USIM in the UICC and return a profile download instruction;

the IMEI number providing module 52 is configured to receive a proactive provide local information command sent by the USIM in the UICC and send a terminal response including the IMEI number of the terminal to the UICC.

The above description is only embodiments of the present document and is not used to limit the protection scope of the present document. Any modifications, equivalent substitutions and improvements made within the essence and principles of the present document should be included within the protection scope of the present document.

INDUSTRIAL APPLICABILITY

As described above, the smart card dynamic binding method, device and system provided in the embodiment of the present document has the following beneficial effects: the smart card dynamic binding method in the embodiment of the present document is simple in operation and easy to implement, and can satisfy the security requirements of the binding of the terminal and the smart card in the Internet of Things environment.

What is claimed is:

1. A smart card dynamic binding method, comprising:
a universal integrated circuit card, UICC, being provided with a first basic file and a second basic file, wherein, the first basic file is used for pre-storing an International Mobile Equipment Identifier, IMEI, of a terminal or a group of terminals, and the second basic file is used for storing a status flag of binding check result;
a universal subscriber identity module, USIM, in the UICC setting a personal identification number, PIN, to a blocked state before selecting an application, instructing the terminal that a USIM Service Table supports an Additional TERMINAL PROFILE, and receiving a Profile download instruction from the terminal;
the USIM sending a proactive PROVIDE LOCAL INFORMATION command to the terminal after determining that the terminal supports the PROVIDE LOCAL INFORMATION command;
the UICC receiving a TERMINAL RESPONSE including an IMEI number of the terminal, matching the IMEI number with the IMEI number in the first basic file, and when the matching succeeds, determining that the binding check succeeds, setting a status flag of binding check success into the second basic file, and starting an initialization process of the USIM, and setting the PIN to an unblocked state and a Disable state.

2. The smart card dynamic binding method of claim 1, wherein, said sending the PROVIDE LOCAL INFORMATION command to the terminal comprises: executing the sending of the PROVIDE LOCAL INFORMATION command through an application program which is pre-embedded in the UICC as a code of an operating system in the UICC.

3. The smart card dynamic binding method of claim 1, wherein, the UICC matching the IMEI number with the IMEI number in the first basic file comprises: executing the matching of the IMEI number of the terminal with the IMEI number in the first basic file through a script file.

4. The smart card dynamic binding method of claim 3, wherein, the script file is pre-embedded in the UICC as a code of an operating system in the UICC.

5. The smart card dynamic binding method of claim 1, wherein, the method further comprises: the UICC accepting a dynamic management of a management platform for the first basic file through an OTA mechanism.

6. The smart card dynamic binding method of claim 1, wherein, the method further comprises: the UICC providing background personnel with reading of the status flag of binding check result in the second basic file through an OTA mechanism.

7. The smart card dynamic binding method of claim 1, wherein, the method further comprises: when the UICC performs an OTA interaction with the terminal, the terminal determining that a data change has occurred in the first basic file, and executing operations of restarting and resetting the terminal, the UICC being initialized after the terminal is restarted, and re-executing a binding check of the UICC and the terminal.

8. The smart card dynamic binding method of claim 1, wherein, the method further comprises: when a data change has occurred in the first basic file, the UICC sending a proactive refresh command to the terminal to trigger a 3G session or a reset of the UICC; after the terminal refreshes, the UICC being initializing and re-executing a binding check of the UICC and the terminal.

9. The smart card dynamic binding method of claim 1, wherein, the method comprises:
a terminal receiving an instruction that a USIM service table supports an Additional TERMINAL PROFILE sent by a USIM in a UICC and returning a Profile download instruction;
the terminal receiving a PROVIDE LOCAL INFORMATION command sent by the USIM in the UICC and sending a TERMINAL RESPONSE including an IMEI number of the terminal to the UICC.

10. The smart card dynamic binding method of claim 9, wherein, the method further comprises: when the UICC performs an OTA interaction with the terminal, the terminal determining that a data change has occurred in a first basic file, and executing operations of restarting and resetting the terminal.

11. The smart card dynamic binding method of claim 9, wherein, the method further comprises: when receiving a proactive refresh command sent by the UICC, the terminal performs a refresh operation to trigger a 3G session or a reset of the UICC.

12. A UICC which is provided with a first basic file and a second basic file, wherein, the first basic file is used for pre-storing an IMEI of a terminal or a group of terminals, and the second basic file is used for storing a status flag of binding check result;

the UICC further comprises: a USIM application module, and a matching module; wherein, the USIM application module is configured to set a PIN to a blocked state before selecting an application, instruct the terminal that a USIM service table supports an Additional TERMINAL PROFILE, and receive a Profile download instruction from the terminal, after determining that the terminal supports a PROVIDE LOCAL INFORMATION command, send a proactive PROVIDE LOCAL INFORMATION command to the terminal and sets the PIN to an unblocked state and a Disable state after starting an initializing process of the USIM;

a matching module is configured to receive a TERMINAL RESPONSE including an IMEI number of the terminal, match the IMEI number with the IMEI number in the first basic file, and determine that the binding check succeeds when the matching succeeds, set a status flag of binding check success into the second basic file, and start an initialization process of the USIM.

13. The UICC of claim 12, wherein, the USIM application module is specifically configured to execute the sending of the proactive PROVIDE LOCAL INFORMATION command through an application program which is pre-embedded in the UICC as a code of an operating system in the UICC.

14. The UICC of claim 12, wherein, the matching module is specifically configured to execute the matching of the IMEI number of the terminal with the IMEI number in the first basic file through a script file.

15. The UICC of claim 12, wherein, the UICC further comprises: a dynamic management module, configured to accept a dynamic management of a management platform for the first basic file through an OTA mechanism.

16. The UICC of claim 15, wherein, the dynamic management module is further configured to provide background personnel with reading of the status flag of binding check result in the second basic file through the OTA mechanism.

17. The UICC of claim 12, wherein, the UICC further comprises: a re-binding module, configured to notify the USIM application module after the terminal is restarted; or send a proactive refresh command to the terminal when a data change has occurred in the first basic file to trigger a 3G session or a reset of the UICC, and notify the USIM application module after the terminal refreshes.

\* \* \* \* \*